United States Patent [19]

Deminski

[11] 4,228,820
[45] Oct. 21, 1980

[54] SEAT GUIDED POPPET VALVE HAVING FLOW AND DAMPENING CONTROL MEANS

[75] Inventor: Richard M. Deminski, Mount Vernon, Ohio

[73] Assignee: The Yorde Machine Products Company, Nelsonville, Ohio

[21] Appl. No.: 866,033

[22] Filed: Dec. 30, 1977

[51] Int. Cl.³ .............................................. F16K 15/02
[52] U.S. Cl. .............................. 137/514.3; 137/514.5; 137/536; 137/543.21; 137/543.23
[58] Field of Search ............ 137/514.3, 514.5, 543.21, 137/543.23, 536, 540; 188/311, 316

[56] References Cited

U.S. PATENT DOCUMENTS

| | | | |
|---|---|---|---|
| 558,034 | 4/1896 | Brown, Jr. et al. | 137/514.5 |
| 609,726 | 8/1898 | Ball | 137/514.3 |
| 843,988 | 2/1907 | Barton | 137/514.3 |
| 1,105,255 | 7/1914 | Caskey | 137/514.5 |
| 1,377,199 | 5/1921 | Granby | 137/536 X |
| 2,094,951 | 10/1937 | Kowan | 137/514.3 |
| 3,701,361 | 10/1972 | Bunn et al. | 137/543.23 |
| 4,048,905 | 9/1977 | Souslin | 188/316 X |

Primary Examiner—William R. Cline

[57] ABSTRACT

A seat guided poppet valve for fluid compressors and the like having improved flow directing characteristics provided by a poppet element having integral flutes surrounded by a shroud and variable dampening provided by adjustable seals or dashpots. The dashpot may reciprocate with the poppet element or be constrained within the guard. A seat seal is established by conventional abutment of the poppet element head surface with the seat outlet port seating surface, or by eliminating that portion of the poppet element head overhanging the seat outlet port so that the circumferential surface of the head makes a sliding seal with the inner surface of the seat bore. Additional sealing may be provided by a resilient ring entrained within a groove inscribed in the circumferential surface of the poppet element head, or by constructing the circumferential surface of a resilient material which deforms as the head enters the seat bore. Lift washers are provided to control the amount of valve lift.

23 Claims, 13 Drawing Figures

SEAT GUIDED POPPET VALVE HAVING FLOW AND DAMPENING CONTROL MEANS

BACKGROUND OF THE INVENTION

1. Field of the Invention

The present invention relates generally to poppet valves, and more particularly to a seat guided poppet valve having improved flow directing characteristics and variable dampening.

2. Description of the Prior Art

The growing necessity for energy conservation, particularly in the area of natural gas reserves, has kindled new interest in developing better ways to transport natural gas and the like more efficiently and at less cost. Generally, gas transmission facilities have relied on reciprocating compressors to move the gas through pipelines connecting the gas reserve to the intended point of use. Many of these compressors utilize poppet valves to provide suction or discharge capability. Inasmuch as these valves may experience up to one thousand closures per minute or more, any deficiency of the valve results in reduced efficiency, excessive wear and possible valve failure.

As is well understood, the poppet element or poppet is a spring-loaded mushroom-shaped pneumatically actuated seal which reciprocates in coaxial bores in a valve seat and a guard or stop. In conventional valves, the poppet is guided by a stem portion in the valve guard. A spring received in a recess or counterbore in the stem serves to provide a return force for initiating the return of the poppet as well as to provide an opposing force to prevent premature and excessively rapid opening of the valve. Generally, a close fit between the poppet stem and the guard is required to provide dampening action.

Such valves have historically experienced manufacturing and maintenance problems, arising from the fact that the poppet head must be accurately positioned with respect to its mating seating surface on the valve seat. Since the poppet is guided in the guard, extremely close tolerances are required to develop the proper mechanical alignment between the seat and guard. For this reason, seats and guards must generally be maintained in matched sets, which complicates routine servicing and prevents renewal of the seat sealing surface without replacement of the entire valve. It has been suggested that additional clearance be provided between the poppet stem and the guard, which had led to unsatisfactory dampening action and poppet seating. Furthermore, these large clearances have generally prevented optimization of valve action for efficient compressor operation through adjustable dampening or variable valve lift.

Efficiency has also been reduced in prior art poppet valves by turbulence created by restrictions in the flow path, which leads to non-uniform flow velocities, losses and unnecessarily large pressure drops. For such compressors, it has been found that any turbulence produces resistance impeding the flow of gas leading to increased component wear.

SUMMARY OF THE INVENTION

The poppet valve of the present invention overcomes the inadequacies of prior art valves through less rigorous manufacturing requirements, increased operating efficiency and optimized performance. The valve finds particular utilization in critical applications involving reciprocating compressors used to transmit natural gas or other valuable fluid commodities.

The valve comprises a mated guard and seat, each having communicating bores therein, and a poppet element which is free to reciprocate within the bores. The body of the poppet element or poppet is substantially mushroom-shaped, including a cylindrical stem portion slidably received in the guard bore, and an integral head portion which cooperates with the valve seat to form a seal. The upper or seat-guided portion of the poppet forms three spaced vane-like flutes extending radially outwardly from the longitudinal axis of the poppet. The poppet is guided within the seat bore by the longitudinal edges of the flutes, thereby eliminating all guiding action by and dependency upon the valve guard. While the stem portion of the poppet slidably reciprocates within the guard bore, the tolerances required between the poppet and the guard are much less critical, thereby eliminating problems caused by misalignment and the need for furnishing the guard and seat in matched sets as in prior poppet valve configurations which depend on running clearances between the poppet and the guard. The design of the present invention is also less susceptible to temperature changes and adiabatic temperature rise which has plagued prior art poppet valves incorporating close running tolerances. The flutes also add to the structural integrity and resistance to breakage of the poppet head.

The junction of the flutes and head portion of the poppet is concave to provide a smooth transition in flow direction. This feature in combination with the flow directing flutes reduces turbulence which leads to a gain in efficiency. A thin-walled cylindrical shroud may also surround the flutes to provide additional guiding area within the seat which prolongs poppet life. Openings between the lower edge of the shroud and the upper surface of the poppet head provide additional flow channeling.

The poppet stem contains a counterbore which receives a compression spring which serves to provide a return force for the poppet as well as to prevent premature and excessively rapid opening of the valve. Conventional valves have relied on the spring characteristics or the running clearance between the poppet stem and the guard bore to provide the necessary dampening critical to extended valve life. The present invention contains an integral dampening device in the form of a resilient seal received within a circumferential groove in the outer surface of the poppet stem which slidably cooperates with the inner wall of the guard bore, or an adjustable dashpot which reciprocates within the poppet stem counterbore. The dashpot comprises a thimble slidably received within the poppet stem counterbore containing a coaxial counterbore for accepting the opposing end of the poppet compressing spring. Dampening may be adjusted by controlling the clearance between the outside diameter of the thimble and the inside diameter of the poppet stem counterbore. Additional dampening control may be attained by a properly sized orifice extending through the thimble wall and communicating with the fluid contained in the guard bore, so as to provide controlled opening or closing of the valve. A jointless seal ring contained within a groove inscribed circumferentially about the outer surface of the thimble may be used in combination with the orifice for additional valve dampening. Similarly, a seal ring having an adjustable gap may be utilized with or without a cooperating orifice in the thimble body to provide proper resistance to valve opening and closing. With any of the seal rings, sufficient running clearance may be provided between the thimble body and the guard bore to permit a degree of thimble movement transverse to the longitudinal axis of the poppet. The lower guard-engaging end of the thimble is of convex curvature to eliminate side loads, thus providing a self-aligning action which eliminates valve hang-up and excessive wear.

The dashpot thimble may be free to reciprocate with the poppet element, or may be restrained by means of a circular ring engaging cooperating circumferential grooves in the outer surface of the thimble and the inner surface of the guard bore. The ring may be dimensioned to fit snugly within the thimble groove and loosely within the guard bore groove, so that the entire thimble may be inserted into the guard bore as a unit. In an alternative embodiment, the ring fits snugly within the guard bore groove, with the thimble being inserted such that the groove circumscribed in the outer surface of the thimble engages the locking ring. The elimination of the poppet element dependence on the guard together with the improved dampening features allows for higher lift of the poppet element and, therefore, improved flow area and reduced losses.

Another embodiment eliminates the seating surface between the upper edge of the poppet head and the lower surface of the seat to produce a headless poppet element. In this construction, a seal is produced between the outer circumference of the poppet head and the inner surface of the seat bore by means of a continuous resilient seal ring restrained within a cooperating circumferential groove on the outer surface of the poppet element, which slidably communicates with the inner surface of the seat bore to provide positive sealing action. The poppet valve is restrained in its fully closed position by means of a stop comprising an inwardly directed shoulder formed in the inner surface of the seat bore which abuts the uppermost edges of the vane-like flutes or the shroud, thereby extending the life of the poppet element by eliminating the dependence on the upper surface of the poppet element head as both a sealing surface and a movement limiting stop. This embodiment may be used in association with the flow directing and dampening features of the poppet element as described hereinabove.

In a further refinement of the headless poppet element, a lip seal is used to provide sealing between the poppet element and the seat, rather than a resilient sealing ring. In this arrangement, the resilient outer circumference of the poppet element head is chamfered so as to easily engage and slidingly abut the valve seat as the poppet element reciprocates. The lower edge of the poppet head may be provided with an annular groove to facilitate flexure of the head as it moves within the valve seat. Flow and dampening control may also be utilized with this poppet structure. The headless poppet element embodiments guard against failures of the cap-shaped poppet element head which have plagued prior art designs.

A spacer plate or lift washer may be utilized with the poppet valve of the present invention to reduce the poppet element movement when operating conditions indicate that a reduced movement or lift is desirable. The lift washer comprises a thin plate, the washer being secured to the upper surface of the guard stop so as to contact the poppet element when the valve is open. The valve lift may be controlled by adjusting the thickness of the washer, or by stacking multiple washers of a standard thickness.

DESCRIPTION OF THE PREFERRED EMBODIMENTS

The description to follow for the various embodiments for the poppet valve of the present invention are described, for purposes of an exemplary showing, in association with a valve of the discharge type. It will be understood, however, that the same principles and features may be incorporated into a valve of the suction type by suitable rearrangement of parts.

Figure 1:
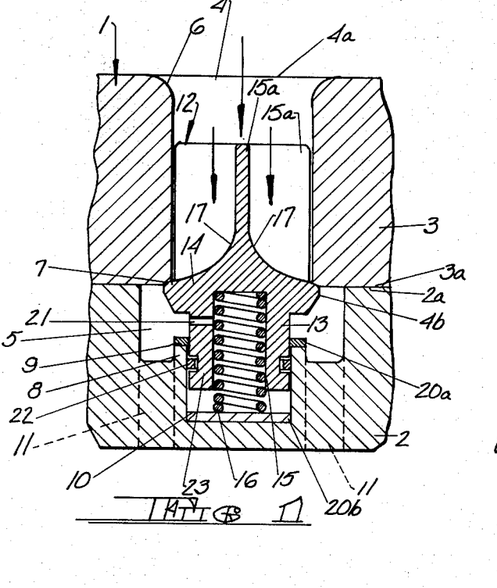
FIG. 1 is a fragmentary cross sectional view of a first embodiment of the poppet valve of the present invention, with the valve shown in closed position.

FIG. 1 illustrates a first embodiment of the poppet valve, shown generally at 1, of the present invention. The valve body comprises a flat, plate-like guard 2, having a smooth finished mating surface 2a, which abuts a similar mating surface 3a associated with plate-like seat 3. Seat 3 contains substantially circular counterbore 4 having an upper inlet port 4a which communicates with a source of fluid, not shown, and a lower outlet port 4b which communicates with a shallow bore 5 in guard 2. The edges of inlet port 4a may be rounded, as at 6, to facilitate fluid flow and reduce turbulence. The edges of the outlet port 4b may be chamfered as at 7 to produce a smooth seating surface for the poppet element head as will be described hereinafter. Guard 2 and seat 3 may be securely mated together by pins, threaded couplings or the like.

Bore 5 is coaxial with and of slightly larger diameter than seat counterbore 4. Bore 5 contains a coaxial upstanding shoulder 8 having a substantially flat upper surface 9 which acts as a stop for the poppet element, as will be described. Shoulder 8 is of such a height as to provide the proper lift for the poppet. Bore 5 also includes a second bore 10 dimensioned to receive the poppet element stem, as will be described. The inner surface of bore 10 is coextensive with the inner surface of shoulder 8. Alternatively, the poppet element may be so dimensioned that the lower edge of the poppet element contacts the bottom surface of guard bore 10 to limit poppet element travel toward guard 2.

Guard 2 also contains a plurality of channels, such as those shown at 11, which permit fluid to be exhausted from bore 5 to a fluid passage, not shown.

Valve 1 also contains a poppet element, shown generally at 12, which slidably communicates with guard 2 and seat 3 within bores 4 and 5. Poppet element 12 comprises a substantially mushroom-shaped body portion having a cylindrical stem 13 slidably received in bore 5, and a cap-shaped head 14, the upper surface of which abuts seating surface 7 of outlet port 4b. Poppet element 12 may be constructed of any suitable material, the use of a resilient composition such as nylon, fiberglass, Teflon or the like, or blends thereof, being preferred to reduce noise and improve the impact quality and resistance to breakage of the poppet element. Stem portion 13 contains a counterbore 15 substantially coaxial with the longitudinal axis of the poppet element 12, which receives a compression spring 16. The lower end of compression spring 16 rests on the bottom surface of bore 10, while the upper end of spring 16 abuts the upper surface of counterbore 15. Spring 16 serves to provide a return force for initiating the return of poppet element 12 from the open position, as well as to provide an opposing force to prevent premature and excessively rapid opening of the valve. It will be understood that the dampening characteristics of poppet element 12 may be controlled to a certain extent by proper choice of the characteristics of spring 16. In addition, dampening may be controlled by regulating the running clearance between the outer surface of stem portion 13 and the inner surface of bore 10. It is emphasized that poppet element 12 does not depend on bore 10 in guard 2 for guidance in its reciprocating movement.

Figure 2:
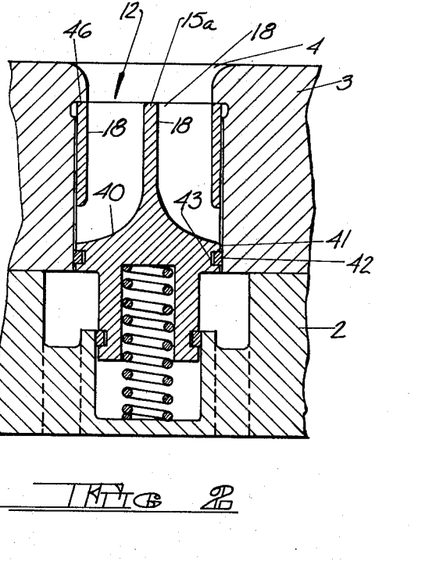
FIG. 2 is a fragmentary cross sectional view of a second embodiment of the poppet valve of the present invention, showing a headless poppet and a shroud surrounding the flutes.
Figures 2A, 3, 4:
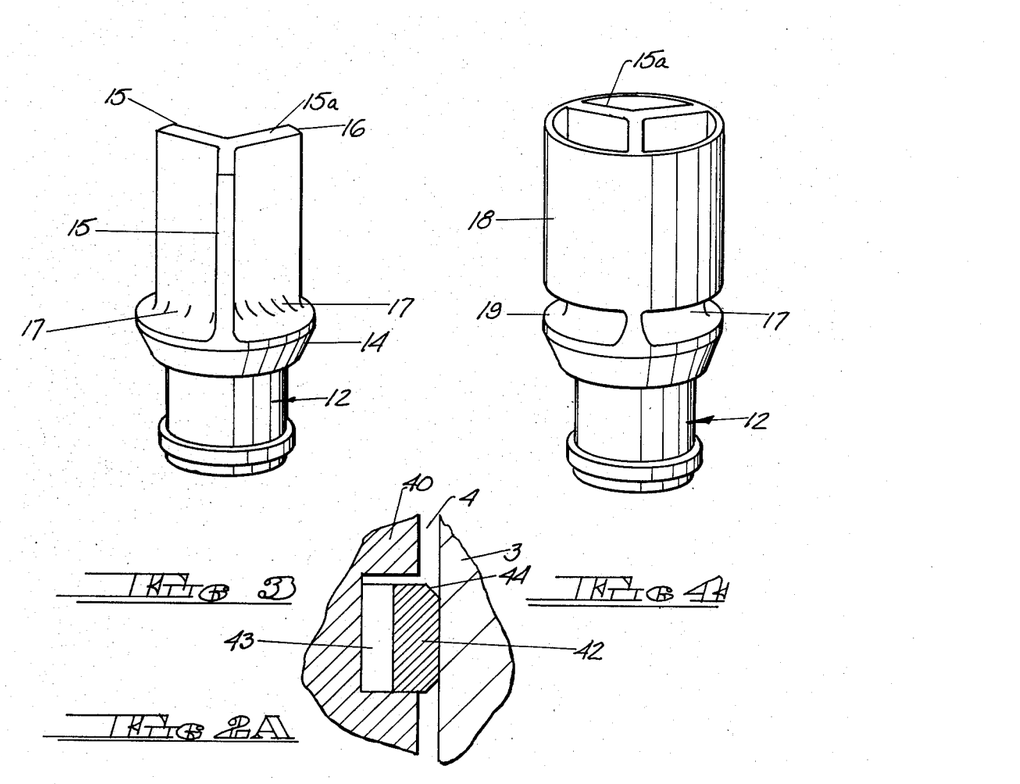
FIG. 2a is an enlarged partial cross sectional view of the poppet element sealing ring of the embodiment of FIG. 2.
FIG. 3 is an enlarged perspective view of the poppet element of the embodiment of FIG. 1.
FIG. 4 is an enlarged perspective view of the poppet element of FIG. 3 including a shroud surrounding the flutes.

The upper surface of head portion 14 of the poppet element terminates in three equally spaced vane-like flutes 15a extending radially outwardly from the central axis of the poppet 12, as can best be seen in FIG. 3. The outermost edges of flutes 15a are rounded, as at 16, so as to slidably engage the inner surface of seat counterbore 4. The poppet is thus guided by the seat 3 of valve 1, rather than by the guard 2 as in prior art poppet valves, thereby eliminating problems caused by misalignment between the guard and the seat as well as extremely close machining tolerances. That is, with the improved design of all embodiments of the present invention, positional inaccuracies existing between guard 2 and seat 3 will not adversely affect the seating of the head portion 14 of the poppet 12 against seating surface 7 of seat 3.

The junction of flutes 15a with head 14 form concave surfaces, seen at 17. This curvature 17 in association with flutes 15a provides flow direction assuring more uniform utilization of the flow passages, as well as minimizing flow direction changes, thereby reducing turbulence which can lead to pressure loss and inefficient operation. Further improvement in flow direction and seat guiding may be provided by the addition of a thin-walled cylindrical shroud 18 which surrounds the flutes, as shown in FIG. 4. Shroud 18 is fixedly attached at its inner surface to the longitudinal edges 16 of flutes 15a. The outer surface of shroud 18 communicates with the inner surface of seat counterbore 4 to provide increased bearing area. Three equally spaced arcuate openings 19 are left between the lower edge of shroud 18 and the upper edge of poppet head portion 14 to permit the escape of fluid. The edges of openings 19 may be rounded to provide minimum resistance to fluid flow, as well as sized to optimize the flow characteristics for a particular application.

In operation, fluid enters the valve through inlet port 4a and bears against curved surfaces 17 after being divided by flutes 15a into three flow paths, as shown by the arrows in FIG. 1. The pressure exerted against curved surfaces 17 creates a downward force on poppet 12 tending to move poppet 12 downwardly against the opposing force of spring 16, producing an opening between the upper surface of poppet head 14 and seat surface 7 for the escape of fluid through guard bore 5 and passageways 11. Downward movement of poppet 12 is limited by surface 9 of shoulder 8 which acts as a stop, bearing against the underside of poppet head 14. Alternatively, downward movement of poppet 12 is limited by the lower surface of bore 10 which acts as a stop, bearing against the lower surface of stem 13. The amount of downward movement or lift permitted poppet 12 may be controlled by the height of shoulder 8, or by extending the height of shoulder 8 by means of one or more lift washers, one of which is shown at 20a, or by controlling the length of stem 13 or by limiting the depth of bore 10 with one or more lift washers 20b. Lift washer 20a comprises a thin flat plate of any suitable material having a circular aperture therein coextensive with guard bore 10, thus permitting poppet stem 13 to slide therethrough. Lift washer 20b is similar to lift washer 20a but may not require a central aperture, depending on the particular application. The appropriate amount of valve lift may be provided by a single lift washer 20a or 20b, or by a plurality of stacked washers, or by a combination of both types.

The poppet valve of the present invention also incorporates an adjustable self-contained dampening device to produce closing resistance in addition to that provided by compression spring 16. Dampening may be controlled by adjusting the running clearance between the outer surface of poppet stem 13 and the inner surface of guard bore 10, for example by machining stem 13. Additional control may be obtained by providing an orifice, such as that shown at 21 in FIG. 1, extending through the wall of stem 13 and connecting stem counterbore 15 with guard bore 5, orifice 21 being so sized as to provide the proper amount of fluid escape to control dampening. As shown in FIG. 1, orifice 21 may be positioned longitudinally on stem 13 so as to be closed by the inner surface of bore 10 when poppet 12 is only partially opened, thereby preventing further escape of fluid and increasing the resistive force. It will be understood that the degree of dampening obtained in association with these features will depend upon the compressibility of the fluid involved.

Alternative means for providing controlled valve dampening are also illustrated in FIG. 1 in the form of a resilient ring 22 contained within a circumferential groove 23 extending around the outer surface of stem 13, such that the outer surface of ring 22 communicates with the inner surface of guard bore 10. In this configuration, dampening is controlled by the degree of sliding friction between ring 22 and the wall of bore 10, as well as by the amount of fluid escaping between ring 22 and groove 23. In particular, the amount of resistance offered poppet 12 may be controlled by the size of the flow space permitted between the circumferential surfaces of ring 22 and groove 23.

In one preferred embodiment, ring 22 comprises a continuous member sized to produce a predetermined flow space for a particular poppet 12. Ring 22 may also be split or C-shaped so that the flow space may be varied by adjusting the distance between the split ends of the ring. That is, the narrower the distance between the gap between the split ends of ring 22, the wider will be the flow space between the ring and groove 23.

Figures 5, 6:
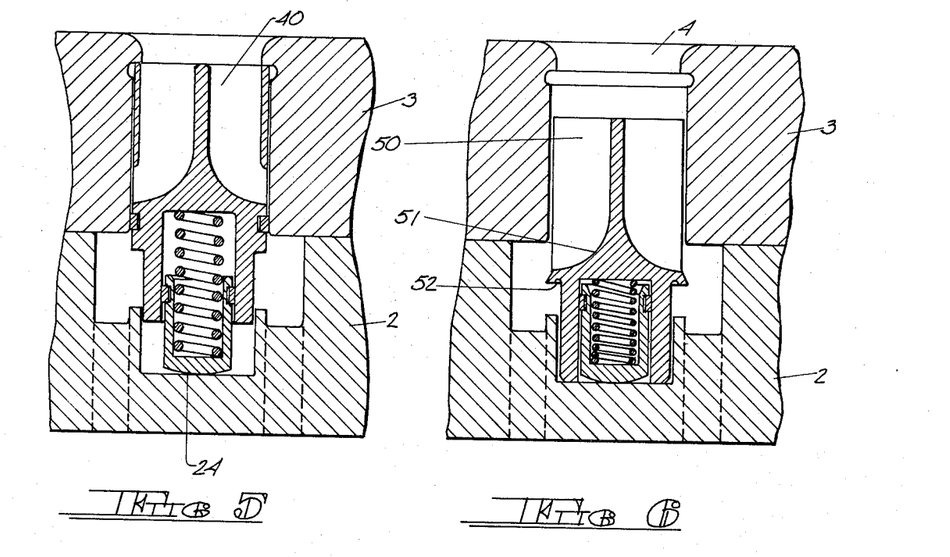
FIG. 5 is a fragmentary cross sectional view of the embodiment of FIG. 2 incorporating dashpot dampening means.
FIG. 6 is a fragmentary cross sectional view of a third embodiment of the poppet valve of the present invention including a poppet element having a lip seal and dashpot dampening means, illustrating the poppet element in the open position.
Figures 5A, 7, 8:
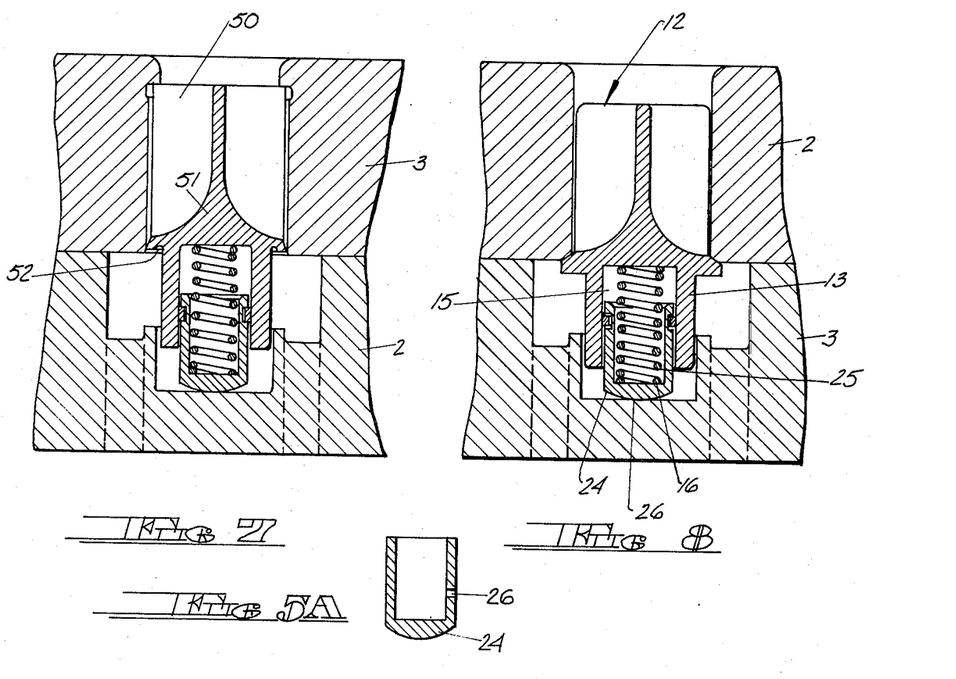
FIG. 5a is a partial cross sectional view of an alternative thimble construction for use in the embodiment of FIG. 5.
FIG. 7 is a fragmentary cross sectional view of the embodiment of FIG. 6 illustrating the poppet element in the closed position.
FIG. 8 is a fragmentary cross sectional view of the embodiment of FIG. 1 including dashpot dampening means.

Dampening may also be controlled by means of an integral dashpot as shown in FIG. 8. In this configuration, counterbore 15 of stem 13 is dimensioned to slidably receive a hollow thimble 24, shown in more detail in FIG. 11. Thimble 24 comprises a cylindrical member having a coaxial counterbore 25 extending part of the way therethrough for accepting the lower part of compression spring 16. In this configuration compression spring 16 rests on the inside surface of counterbore 25 rather than the surface of guard bore 10, as in the embodiment of FIG. 1. The guard engaging surface of thimble 24 is convex, thereby allowing the thimble to be self-aligning and eliminating side loads that might cause a flat-ended thimble to hang-up or wear excessively.

Dashpot dampening may be controlled by adjusting the running clearance between the outer surface of thimble 24 and the inner surface of stem counterbore 15. In addition, a dampening control orifice 26 may be provided as shown in FIG. 5a, extending through the wall of thimble 24, thereby providing fluid communication between thimble counterbore 25 and guard bore 10. The size of orifice 26 and its longitudinal position may be adjusted to provide varying degrees of dampening, as described heretofore in connection with the orifice 21 of the embodiment of FIG. 1. Further control may be provided by the use of a resilient seal ring 27 restrained in a circumferential groove 28 on the outside surface of thimble 24, such that the outer surface of ring 27 slidably abuts the inner surface of counterbore 15 in a manner similar to that described heretofore in connection with the embodiment of FIG. 1. Ring 27 may be continuous, or of the split variety as shown in FIG. 11, wherein the amount of dampening desired may be adjusted by adjusting the width of the gap 29 between the free ends of ring 27.

Figure 9:
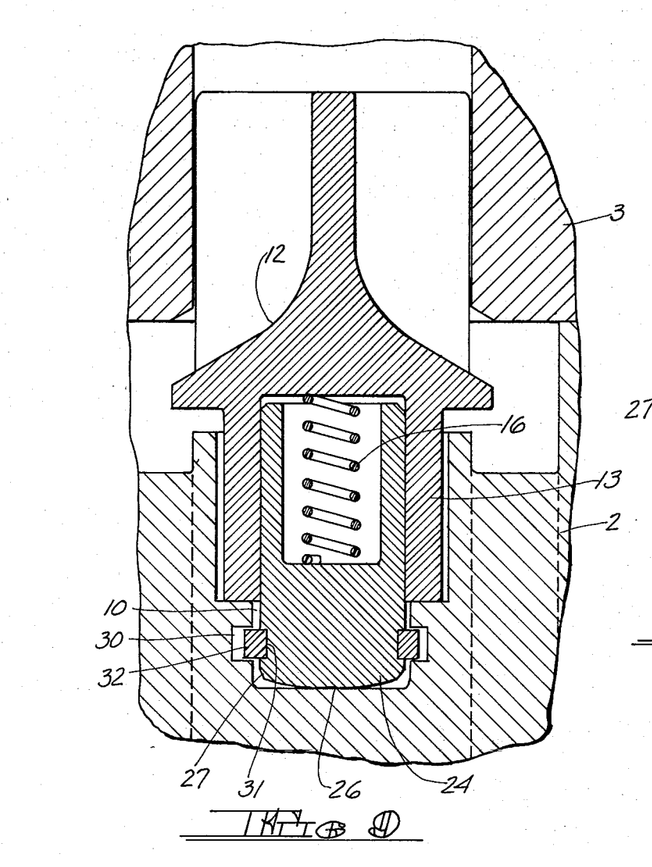
FIG. 9 is an enlarged fragmentary cross sectional view of a fourth embodiment of the poppet valve of the present invention utilizing constrained dashpot dampening means.

In the embodiments previously explained, it is anticipated that compression spring 16 will cause thimble 24 to remain in a relatively fixed position within guard 3. However, in some applications it may be found that a pneumatic lock will be created between the poppet 12 and thimble 24, causing the thimble to move with the poppet, adding to the moving mass within the valve as well as creating excessive wear on the moving components. To overcome this situation, FIG. 9 and FIG. 10 illustrate captive thimble embodiments in which relative movement between thimble 24 and guard 3 is prevented. In these illustrations, poppet element 12 is shown in the open position for clarity. Concentric groove 30 and 31 are inscribed circumferentially in the surfaces of guard 3 and thimble 24, respectively. In the embodiment of FIG. 9, thimble groove 31 tightly engages locking ring 32, which may be of the continuous or split variety. In this configuration, groove 30 and ring 32 are so dimensioned as to provide a loose fit, thereby permitting thimble 24 a slight freedom of movement in directions parallel and transverse to the poppet longitudinal axis, thereby eliminating the criticality of alignment between the thimble and guard. In assembling the embodiment of FIG. 9, locking ring 32 is first snapped into position within guard groove 30. Thimble 24 is then pressed into place against ring 32, a taper 27 on the entering end 26 of thimble 24 operating to expand ring 32 until the ring finally enters thimble groove 31 and is held firmly in place therein.

Figures 10, 11:
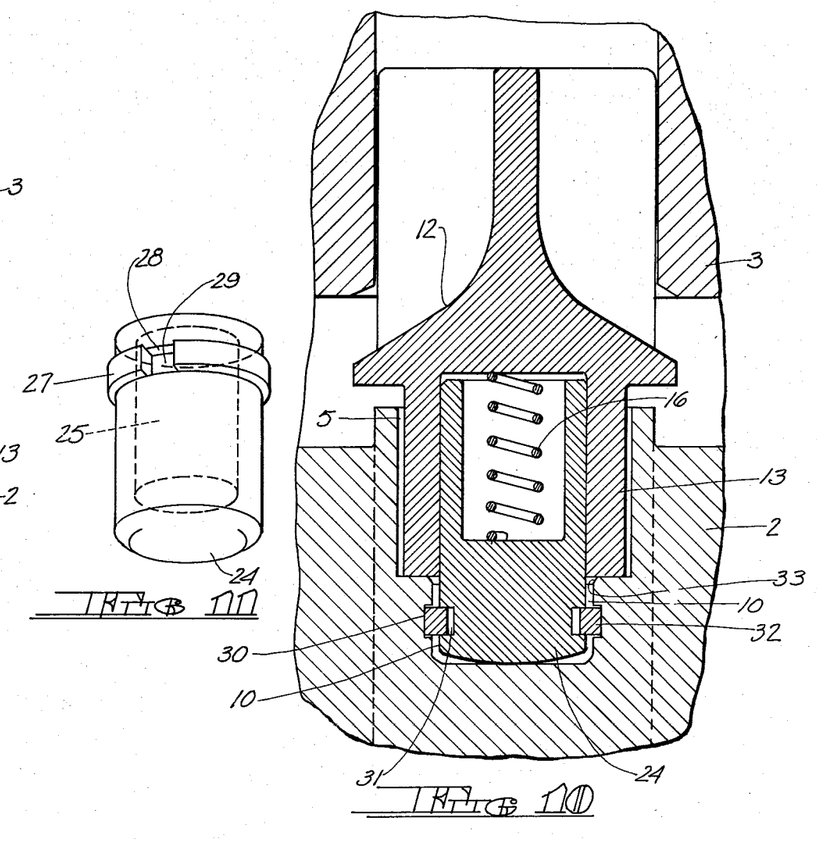
FIG. 10 is an enlarged fragmentary cross sectional view of an alternative construction for the embodiment of FIG. 9.
FIG. 11 is an enlarged perspective view of the dashpot thimble of the embodiments of FIG. 5–FIG. 8.

In the embodiment of FIG. 10, locking ring 32 is held tightly against the inner surface of guard groove 30, with a gap between the ring and the inner surface of thimble groove 31, again permitting limited longitudinal and transverse movement. In assembling this construction, locking ring 32 is assembled within thimble groove 31 and compressed to the point where it may enter guard bore 10. Compression is facilitated by a chamfer 33 circumscribed on the entrance opening of bore 10. Thimble 24 is then pressed into position until locking ring 32 enters guard groove 30.

It will be understood that a shroud, lift washers and dampening orifices, as hereintofore described, may be incorporated into the embodiments of FIG. 8–FIG. 10 as required.

Whereas in previous embodiments the upper surface of poppet head 14 has been relied upon to provide a seating surface against seat 3 as well as a stop to limit poppet travel in the upward direction, the headless poppet design of FIG. 2 eliminates valve dependency on the upper surface of poppet head 14. In general, the embodiment of FIG. 2 is identical with that of FIG. 1, except that the portion of poppet head 14 overhanging seat counterbore 4 has been eliminated so that the outer circumference of the poppet head slidably engages the inner surface of counterbore 4. This arrangement extends the life of the seat and poppet, as well as improves the flow characteristics by increasing flow area through guard 2. In particular, shearing forces at the poppet head edges are eliminated.

A seal may be provided between the circumferential surface 41 of headless poppet portion 40 by controlling the running clearance between surface 41 and the inner surface of seat counterbore 4. Alternatively, the seal may be established by providing a resilient seal ring 42 entrained within a shallow circumferential groove 43 in portion 40. As is best shown in FIG. 2a, seal ring 42 and groove 43 are dimensioned to provide a space between seal ring 42 and the inner surface of groove 43, as well as to permit a slight degree of movement parallel to the poppet axis of ring 42 within the groove. These features cooperate to urge seal ring 42 slidably against the inner surface of seat counterbore 4. For example, as shown in FIG. 2, fluid entering downwardly between portion 40 and seat bore 4 will apply pressure against the flat upper and inner surfaces of seal ring 42, tending to urge the ring downwardly against the inner edge of groove 43 and outwardly into sliding engagement with seat 3, thus providing a fluid tight seal. This operation is in contradistinction to the dampening control ring 22 described heretofore in connection with the embodiment of FIG.

1, wherein a fluid path exists between the poppet groove and the ring. The upper and lower seat engaging edges of ring 42 are tapered to contain a radius or chamfer as at 44 to facilitate entering the opening of seat counterbore 4. In addition, the edges of counterbore 4 may contain a radius or taper to further prevent the outer portions of ring 44 from being sheared away.

The upper end of seat counterbore 4 contains an inwardly directed shoulder 46 which acts as a stop to limit upward movement of poppet 12 in cooperation with the upper edges of flutes 15a and shroud 18. It will be understood that the addition of shroud 18 in this embodiment not only presents additional sliding area to seat counterbore 4, but also provides additional bearing area for poppet 12 against shoulder stop 46.

FIG. 5 illustrates the headless poppet of FIG. 2 in association with an adjustable dampening control dashpot formed by thimble 24. It will be understood that the construction and operation of the dashpot is similar to that described heretofore in connection with the embodiments of FIG. 5–FIG. 10 and may include any of the features found therein.

FIG. 6 and FIG. 7 illustrate a headless poppet 50 similar to that described in connection with the embodiment of FIG. 2, but utilizing a lip seal rather than the resilient sealing ring described heretofore. As shown in the open position of FIG. 6, the seat engaging periphery of poppet portion 51 tapers downwardly and outwardly, forming a chamfer, the lower edge of which is of slightly greater diameter than the inside diameter of seat counterbore 4. Poppet 50 will normally be constructed of a resilient material, such as nylon, Teflon or the like, enabling the seat engaging periphery of poppet portion 51 to be deformed and compressed as it enters seat counterbore 4. To facilitate the compression, an annular groove 52 is circumscribed about the underside of the overhanging lip of poppet portion 51, to enable the lip to be deformed and form a tight sliding seal between portion 51 and counterbore 4, as illustrated in FIG. 7 where the poppet is shown in the closed position. Although for purposes of an exemplary showing the lip seal is illustrated as completely received within bore 4, it will be understood that the lift of poppet element 50 may be altered so that portion 51 only partially enters bore 4. Flow, lift and dampening control features described heretofore in combination with other embodiments of the invention may be utilized with the embodiment of FIG. 6–FIG. 7, as is well understood in the art.

It will be understood that various changes in the details, materials, steps and arrangement of parts, which have been herein described and illustrated in order to explain the nature of the invention, may be made by those skilled in the art within the principle and scope of the invention as expressed in the appended claims. For example, while for purposes of an exemplary showing the poppet valve of the present invention has been illustrated and described using three vane-like flutes for flow direction and control, it will be understood that any number of such flutes may be employed to provide desired flow characteristics in a particular application.

The embodiments of the invention in which an exclusive property or privilege is claimed are defined as follows:

1. A seated guided poppet valve comprising a seat, a guard mated with said seat and a poppet element movable longitudinally within said guard and seat, said seat having a bore extending therethrough with an inlet port and an outlet port, said inlet port adapted to communicate with a source or sink of fluid, said guard having a first bore therein coaxially communicating with said seat bore and a second bore coaxial with and of lesser diameter than said first bore, said first bore being connected to at least one fluid channel, said poppet element comprising a substantially mushroom-shaped body having a cylindrical stem terminating at one end in a cap-like head, said head having seat-enaging means for forming a substantially fluid-tight seal against said seat, said head terminating in a plurality of elongated vane-like flutes slidingly received within said seat bore and extending radially outward from the longitudinal axis of said poppet element, each of said flutes having a seat abutting surface along the longitudinal edge of the flute for guiding said poppet element solely within said seat bore, said poppet element being guided exclusively by said seat bore as said element reciprocates longitudinally, the junction of said flutes and said head forming concave surfaces extending in a smooth surface between said flutes and said seat engaging means for directing the flow of fluid thereacross to reduce turbulence, said stem being received for longitudinal reciprocating movement within said second guard bore and containing a coaxial bore, said valve further including a compression spring contained within said stem bore and cooperating with said second guard bore for urging said poppet head toward said seat, whereby said seat engaging surface of said poppet head abuts said seat when said valve is closed to prevent fluid flow through said valve and is spaced from said seat when said valve is open to permit fluid flow through said valve.

2. The poppet valve according to claim 1 wherein said outlet port is chamfered to provide a seating surface and said seat engaging means comprises a surface of said head adjacent said concave surfaces which abuts said chamfer when said valve is closed.

3. The poppet valve according to claim 1 wherein said head is received within said seat bore when said valve is closed and said seat engaging means comprises a circumferential groove inscribed in the outer rim of said head and a continuous resilient seal ring received within said groove such that the outer surface of said ring slidably engages the inside surface of said seat bore, the edge of said ring first entering said seat outlet port being tapered to permit easy entrance of said ring within said seat bore, said groove and said ring being dimensioned so as to permit said ring to move parallel and transverse to the longitudinal axis of said poppet element.

4. The poppet valve according to claim 3 wherein the longitudinal edges of said flutes terminate in a thin-walled tubular shroud, said shroud having an outer surface adapted to guide said poppet element within the cooperating seat bore, the end of said shroud adjacent said head containing a plurality of apertures for directing fluid flow from said concave surfaces, said seat bore containing an inwardly directed shoulder adjacent said inlet port for contacting the circumferential edge of said shroud adjacent said inlet port to limit poppet element travel in the direction of said seat.

5. The poppet valve according to claim 1 wherein said head is at least partially received within said seat bore when said valve is closed and said seat engaging means comprises a head having a resilient outer edge, said edge tapering outwardly toward said stem, the widest part of said edge having a diameter larger than the diameter of said seat bore, said head including an annular groove inscribed in the stem abutting surface of said head, whereby said edge may be compressed when said head at least partially enters said seat bore for forming a fluid-tight sliding seal between said seat bore and said head.

6. The poppet valve according to claim 1 wherein said valve includes at least one lift washer mounted within said guard so as to abut said poppet element when said poppet element is spaced from said seat to cooperate in limiting poppet element travel toward said guard to control valve lift, said washer comprising a flat disc-like plate.

7. The poppet valve according to claim 1 wherein said valve includes preselectable dampening control means connected to said stem for controlling the dampening of the poppet element during opening and closing.

8. The poppet valve according to claim 7 wherein said dampening control means comprises at least one orifice extending radially through the wall of said stem providing a passageway for fluid flow between said first guard bore and said stem bore, said orifice being dimensioned to allow a predetermined flow therethrough to produce the desired amount of dampening.

9. The poppet valve according to claim 8 wherein said orifice is positioned longitudinally along said stem so as to become blocked by the inner surface of said second guard bore as said poppet element approaches said guard.

10. The poppet valve according to claim 7 wherein said dampening control means comprises a circumferential groove inscribed in the outer surface of said stem and a resilient seal ring loosely entrained within said groove to permit fluid flow between said ring and said groove, the outer surface of said ring slidably engaging the inner surface of said second guard bore, wherein dampening may be adjusted by controlling the amount of fluid permitted to flow between said ring and said groove.

11. The poppet valve according to claim 10 wherein said ring is split to form a gap, the dampening being controllable by adjusting the width of said gap.

12. The poppet valve according to claim 7 wherein said dampening control means comprises a dashpot associated with said poppet element, said dashpot comprising a thimble slidably received within said stem bore, said thimble having a bore therein substantially coaxial with said stem bore for accepting said compression spring to urge said thimble away from said poppet element, said thimble having a circumferential groove inscribed in the outer surface thereof and a resilient seal ring loosely entrained within said groove to permit fluid flow between said ring and said groove, the outer surface of said ring slidably engaging the inner surface of said stem bore, wherein dampening may be adjusted by controlling the amount of fluid permitted to flow between said ring and said groove.

13. The poppet valve according to claim 12 wherein said ring is split to form a gap, the dampening being controllable by adjusting the width of said gap.

14. The poppet valve according to claim 12 including at least one orifice extending radially through the wall of said thimble providing a passageway for fluid flow between said thimble bore and said second guard bore, said orifice being dimensioned to allow a predetermined flow therethrough to produce the desired amount of dampening.

15. The poppet valve according to claim 12 wherein said second guard bore engaging surface of said thimble is convex to reduce side loads.

16. The poppet valve according to claim 12 wherein said thimble contains means for preventing relative longitudinal movement between said thimble and said guard.

17. The poppet valve according to claim 16 wherein said movement preventing means comprises substantially concentric circumferential grooves inscribed in the outer surface of said thimble and the inner surface of said guard bore, respectively, and an annular locking ring engaging both of said concentric grooves, said ring and said concentric grooves being sized to permit relative movement between said thimble and said guard in a direction transverse to the longitudinal axis of said poppet element.

18. A seat guided poppet valve comprising a seat, a guard mated with said seat and a poppet element movable longitudinally within said guard and seat, said seat having a bore extending therethrough with an inlet port and an outlet port, said inlet port adapted to communicate with a source or sink of fluid, said guard having a first bore therein coaxially communicating with said seat bore and a second bore coaxial with and of lesser diameter than said first bore, said first bore being connected to at least one fluid channel, said poppet element comprising a substantially mushroom-shaped body having a cylindrical stem terminating at one end in a cap-like head, said head having seat-engaging means for forming a substantially fluid-tight seal against said seat, and including guide means connected to said seat engaging means slidingly engaging said seat bore so that said poppet element is guided exclusively by said seat bore, as said element reciprocates longitudinally, said stem being received for longitudinal reciprocating movement within said second guard bore and containing a coaxial bore, said valve including dampening control means comprising a thimble slidably received within said stem bore, resilient means associated with said thimble for urging said thimble away from said poppet element, said thimble further including means for preventing relative longitudinal movement between said thimble and said guard, whereby said seat engaging surface of said poppet head abuts said seat when said valve is closed to prevent fluid flow through said valve and is spaced from said seat when said valve is open to permit fluid flow through said valve.

19. The poppet valve according to claim 18 wherein said guide means comprises a plurality of elongated vane-like flutes extending radially outwardly from the longitudinal axis of said poppet element, each of said flutes having a seat abutting surface along the longitudinal edge of the flute for guiding said poppet element within said seat bore so that said poppet element is guided exclusively by said seat bore as said element reciprocates longitudinally.

20. The poppet valve according to claim 18 wherein said guide means comprises a plurality of elongated vane-like flutes extending radially outwardly from the longitudinal axis of said poppet element, and a thin-walled tubular shroud attached by its inner surface to the outermost longitudinal edges of said flutes, the outer surface of said shroud being configured to guide said poppet element within said seat bore.

21. The poppet valve according to claim 18 wherein said thimble includes a circumferential groove inscribed in the outer surface thereof and a resilient seal ring loosely entrained within said groove, the outer surface of said ring slidably engaging the inner surface of said stem bore.

22. The poppet valve according to claim 18 wherein said means for preventing relative longitudinal movement between said thimble and said guard comprises substantially concentric circumferential grooves inscribed in the outer surface of said thimble and the inner surface of said second guard bore, respectively, and an annular locking ring engaging both of said concentric grooves.

23. The poppet valve according to claim 22 wherein said ring and said concentric grooves are sized to permit relative movement between said thimble and said guard in a direction transverse to the longitudinal axis of said poppet element.

* * * * *